United States Patent [19]
Riggle

[11] Patent Number: 6,023,995
[45] Date of Patent: Feb. 15, 2000

[54] VEHICLE ACCELERATOR PEDAL APPARATUS WITH POSITION-ADJUSTMENT FEATURE

[75] Inventor: Russell K. Riggle, Newcomerstown, Ohio

[73] Assignee: IMO Industries, Inc., Hudson, Ohio

[21] Appl. No.: 09/076,998

[22] Filed: May 13, 1998

[51] Int. Cl.$^7$ .................................................. G05G 1/14
[52] U.S. Cl. .................................................. 74/560; 74/514
[58] Field of Search ........................... 74/514, 560, 513, 74/512; 180/335

[56] References Cited

U.S. PATENT DOCUMENTS

| | | | |
|---|---|---|---|
| 1,203,955 | 11/1916 | Adams | 74/513 |
| 1,255,220 | 2/1918 | Petry | 74/512 |
| 1,414,907 | 5/1922 | Vogt | 74/514 X |
| 1,454,258 | 5/1923 | Adams | 74/513 |
| 1,566,094 | 12/1925 | Ives | 74/513 |
| 2,825,418 | 3/1958 | Kershman | 74/514 |
| 4,087,776 | 5/1978 | Donato | 338/198 |
| 4,123,740 | 10/1978 | Palmer et al. | 338/67 |
| 4,528,590 | 7/1985 | Bisacquino et al. | 338/153 |
| 4,958,607 | 9/1990 | Lundberg | 123/399 |
| 4,976,166 | 12/1990 | Davis et al. | 74/512 |
| 5,133,225 | 7/1992 | Lundberg et al. | 74/560 |
| 5,207,289 | 5/1993 | Wilmo | 74/560 X |
| 5,237,891 | 8/1993 | Neubauer et al. | 74/560 |
| 5,241,936 | 9/1993 | Byler et al. | 123/399 |
| 5,321,980 | 6/1994 | Hering et al. | 73/118.1 |
| 5,396,870 | 3/1995 | Beale | 123/399 |
| 5,427,466 | 6/1995 | Kennedy | 403/117 |
| 5,438,516 | 8/1995 | Neubauer et al. | 364/426.01 |
| 5,887,488 | 3/1999 | Riggle | 74/514 |

OTHER PUBLICATIONS

Product Brochure entitled WM540 Series Electronic Suspended Pedal Assembly by Williams Controls, Inc., of Portland, Oregon, dated Jun., 1995.

*Primary Examiner*—Mary Ann Battista
*Attorney, Agent, or Firm*—Jansson, Shupe, Bridge & Munger, Ltd.

[57] ABSTRACT

A vehicle accelerator pedal apparatus has a fixed base (i.e., a base fixed with respect to the vehicle upon which the apparatus is used) and an accelerator pedal pivot-mounted with respect to the base. The improvement comprises a frame pivot-mounted with respect to the base and defining an included angle therebetween. A sensor is mounted on the frame and an articulated linkage extends between the pedal and the sensor. A position-adjustment mechanism coacts between the base and the frame and sets the included angle. In a highly preferred embodiment, the mechanism includes plural, spaced-apart apertures through a base wall. Each aperture is in registry with a separate radial normal to the pedal pivot axis and by extending a pin through any one of the apertures, the included angle between the fixed base and the movable frame may be adjusted. In a specific embodiment, the spacing between any adjacent pair of radials is about 6°.

15 Claims, 7 Drawing Sheets

VEHICLE ACCELERATOR PEDAL APPARATUS WITH POSITION-ADJUSTMENT FEATURE

FIELD OF THE INVENTION

This invention relates generally to machine elements and mechanisms and, more particularly, to foot-operated control lever and linkage systems involving vehicle accelerator pedals.

BACKGROUND OF THE INVENTION

Almost from the advent of the first motor vehicle powered by an internal combustion engine, engine speed control has been effected by an accelerator pedal mechanically coupled through the vehicle fire wall to an engine "speed regulator" such as a carburetor. When no pressure is applied to the pedal, the engine runs at some preset idle speed. And when vehicle-accelerating pressure is applied to the pedal, the pedal/carburetor linkage opened passages in the carburetor to admit more fuel to the engine. The linkage is "custom-configured" for the particular vehicle, engine and carburetor.

Much more recently, engine and vehicle manufacturers have turned to electrical and electronic engine speed control systems which sense engine temperature, engine load and the like and automatically control pump-fed fuel injectors to cause the proper amount of fuel to be admitted to the engine. Such systems are vastly more flexible in the way they can be installed in the vehicle and applied in the engine ignition system.

As but one example of improved flexibility in application, it is no longer required to extend a mechanical linkage through the vehicle firewall and provide appropriate sealing devices to prevent air leakage into the passenger compartment. Rather, electrical wires can be extended from the accelerator pedal mechanism to the electronic speed control on the engine.

A typical electrical engine throttle control system uses an electrical sensor, the output signal of which is a function of the position of the accelerator pedal. That is, the sensor "senses" pedal position between idle speed and maximum engine speed and the resulting signal is used by the electronic engine speed control system for engine speed regulation. A common sensor is embodied as a potentiometer or "pot" having a rotating stem. As the accelerator pedal is depressed and released, the stem rotates and an appropriate output signal results.

Examples of electronic accelerator pedal mechanisms having a foot pedal and a sensor coupled thereto are disclosed in U.S. Pat. No. 4,958,607 (Lundberg); U.S. Pat. No. 4,976,166 (Davis et al.); U.S. Pat. No. 5,133,225 (Lundberg et al.); U.S. Pat. No. 5,237,891 (Neubauer et al.); U.S. Pat. No. 5,241,936 (Byler et al.) and U.S. Pat. No. 5,321,980 (Hering et al.). U.S. Patent No. 5,133,321 (Hering et al.) discloses a resistive-type throttle control and idle-validation sensor combined into a single component.

While earlier mechanisms have been generally satisfactory for the intended use, they are not without disadvantages. For example, mechanisms of the type shown in the Davis et al. and Neubauer et al. patents have a base fixed with respect to the vehicle. As the accelerator pedal moves, a roller rolls along the base. Dirt or gravel, commonly found in the cabs of construction and mining vehicles, can lodge between the roller and the base. The result is that the position of the roller may "jump" with respect to the base (that is, the roller may temporarily be out of contact with the base) and a false potentiometer signal results.

Other disadvantages arise, in part, because of the configuration and manner of use of the equipment on which the mechanism is mounted, i.e., the ergonomics of the application. (Ergonomics is the science that seeks to adapt work or working conditions to suit the worker.)

For example, many types of equipment, e.g., off-road construction and mining equipment, are, for a particular piece of equipment, used by several different operators. Of course, this may give rise to differing ergonomic considerations in that such operators may have widely-varying preferences as to accelerator pedal position and may have widely-varying physical statures.

Earlier accelerator pedal mechanisms of the electronic type employ a base fixed with respect to the vehicle. The angle of the accelerator pedal in its "engine-idle" position is fixed with respect to the base and with respect to any seat upon which the operator may be seated. A pedal angle which is ideal for one operator of a particular stature may be uncomfortable, especially over a long operating period, for another operator having a significantly different stature.

And there are other important considerations. Road grader operators like to operate the grader while standing. This means that in both the engine-idle and maximum-speed positions, the accelerator pedal is preferably at no more than a shallow angle with respect to the floor upon which the operator stands.

In sharp contrast, some low-profile mining machines are configured so that the operator is in a near-reclining position behind the accelerator pedal. For that type of machine, the accelerator pedal is preferably nearly vertical in both the engine-idle and maximum-speed positions. Known accelerator pedal mechanisms are not readily responsive to these needs.

Yet another disadvantage of some electronic accelerator pedal mechanisms is that the pedal assembly hardware must be configured to accommodate a particular sensor made by a particular manufacturer. For example, the combined control and validation sensor disclosed in the above-noted Hering et al. patent is to be used with Cummins CELECT™ electronic fuel control system. The patent goes on to explain that the sensor may be "adapted" to operate with a variety of control systems and control devices. But, of course, this does not necessarily mean that the pedal assembly hardware can easily be adapted to use any one of a variety of sensors.

Still another disadvantage of some electronic accelerator pedal mechanisms is that pedal operation flexes the electrical cable extending between the sensor and the electronic ignition system. The foot pedal disclosed in the above-noted Davis et al. patent is of this type.

An improved vehicle accelerator pedal apparatus which addresses disadvantages of prior art arrangements would be an important technical advance.

OBJECTS OF THE INVENTION

It is an object of the invention to provide an improved vehicle accelerator pedal apparatus which addresses certain disadvantages of prior art apparatus.

Another object of the invention is to provide an accelerator pedal apparatus which readily adapts to a variety of vehicle applications.

Another object of the invention is to provide a vehicle accelerator pedal apparatus which is more resistant to the effects of dirt.

Yet another object of the invention is to provide a vehicle accelerator pedal apparatus which can be easily adapted to variations in human stature.

Another object of the invention is to provide a vehicle accelerator pedal apparatus which can be easily adapted to the preference of individual machine operators.

Still another object of the invention is to provide a vehicle accelerator pedal apparatus which may be easily configured to accommodate any one of a variety of electrical sensors without modifying such sensors.

Another object of the invention is to provide a vehicle accelerator pedal apparatus which avoids flexing the sensor-connected electrical cable as the pedal is operated. How these and other objects are accomplished will become apparent from the following descriptions and from the drawings.

SUMMARY OF THE INVENTION

The invention involves a vehicle accelerator pedal apparatus of the type having a base fixed with respect to the floor of the vehicle upon which the apparatus is mounted. An accelerator pedal pivot-mounted with respect to the base.

The improvement comprises a frame pivot-mounted with respect to the base and defining an included angle between such frame and base. A sensor is mounted on and fixed with respect to the frame and an articulated linkage extends between the pedal and the sensor. A position-adjustment mechanism coacts between the base and the frame and sets the included angle between them.

In a more specific aspect of the apparatus, the mechanism includes a stop member. When the included angle between the frame and the base is at its minimum value, the stop member coacts between the base and the frame and limits movement of the frame with respect to the base. More particularly, the stop member includes a foot fixed with respect to the frame and extending downwardly from it. When the included angle is at the minimum value, the foot bears against the base and prevents further pivoting of the frame toward the base.

In another aspect of the invention, the included angle between the frame and the base has a minimum value when the frame is parallel to or nearly parallel to the base. The position-adjusting mechanism includes an aperture and a pin. When the pin engages the aperture and extends through it, the included angle between the frame and the base is greater than the minimum value.

In a preferred embodiment, the base includes an upstanding wall extending toward the frame and the aperture is in the wall. The pedal is mounted to pivot about a pedal axis and the aperture is a first aperture in registry with a first radial normal to the pedal axis. The wall includes a second aperture through it and such second aperture is in registry with a second radial normal to the pedal axis and angularly spaced from the first radial. In a highly preferred embodiment, the wall also includes third, fourth and fifth apertures through it. Such third, fourth and fifth apertures are, respectively, in registry with third, fourth and fifth radials normal to the pedal axis and angularly spaced from one another. The angle between any two adjacent pairs of radials, e.g., between the first and second radials or between the third and fourth radials, is between 3° and 10° and, most preferably, is about 6°.

In another aspect of the invention, the pedal is mounted to pivot about a pedal axis, the sensor has an operating shaft which turns about a shaft axis and the linkage is coupled between the shaft and a linkage axis spaced from the pedal axis. The linkage axis is fixed with respect to the pedal and moves when the pedal moves, irrespective of whether such pedal movement is when adjusting the frame-base included angle or when actuating the pedal. The sensor axis is spaced from the pedal axis and the linkage axis and the sensor axis are spaced from one another.

The pedal is mounted for movement between a repose or "engine-idle" position and a biased position at which the vehicle engine is at a speed above idle speed. The linkage axis and the sensor axis are spaced by a dimension. Considered when the pedal is in the repose position, the dimension is unchanged, irrespective of the value of the included angle between the frame and the base.

In yet another aspect of the invention, the frame includes a frame anchor member and the pedal includes a pedal anchor member. A tension spring is coupled to and extends between the anchor members and biases the pedal toward the repose position. Most preferably, the frame includes a pair of spaced frame anchor members having an anchor pin extending between them. Similarly, the pedal includes a pair of spaced pedal anchor members and there is a separate spring extending between each pedal anchor member and the anchor pin. Each spring imposes a force along an axis which is generally parallel to the treadle surface of the pedal and which, in any event is spaced away from the pedal pivot axis.

The apparatus also includes structure which limits pivoting movement of the pedal away from the frame under the urging of the springs. The pedal includes a block-like abutment member affixed to it and contacting the anchor pin when the pedal is in the repose position.

Further details of the new apparatus are set forth in the following detailed description and in the drawings.

DETAILED DESCRIPTIONS OF PREFERRED EMBODIMENTS

Figure 1:
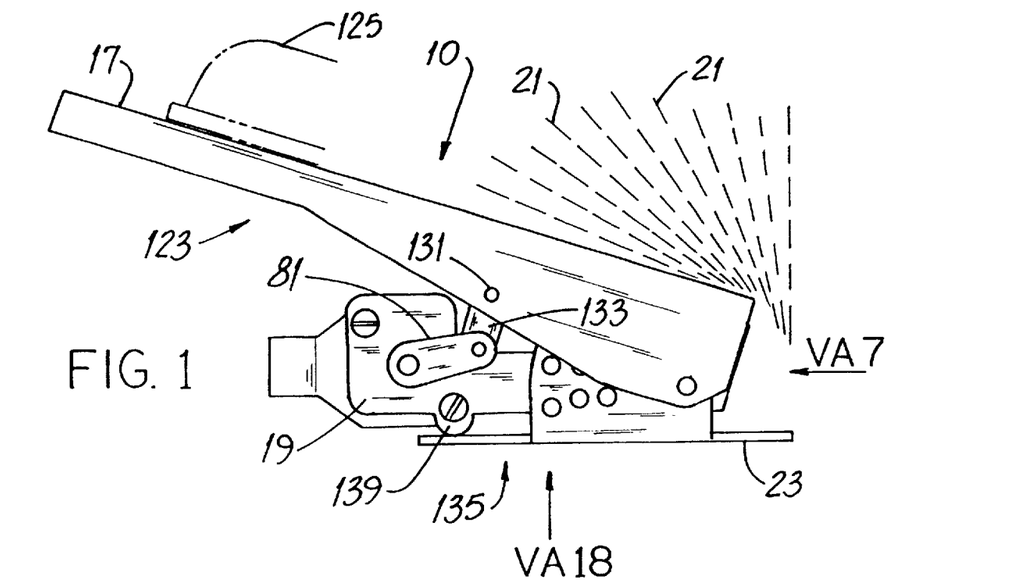
FIG. 1 is a side elevation view of the new vehicle accelerator pedal apparatus with the angle between the control assembly and the base panel at a minimum. An operator's foot is shown in dashed outline.
Figure 2:
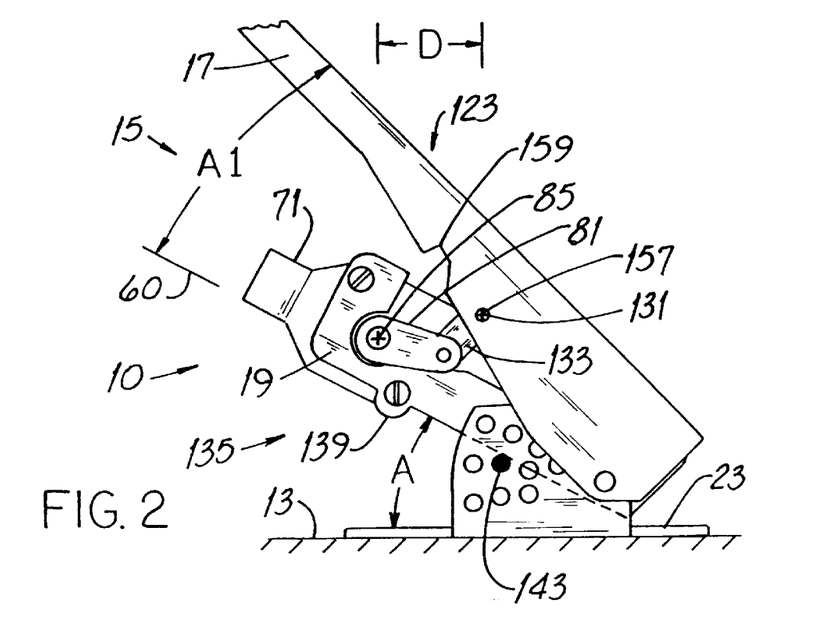
FIG. 2 is another side elevation view of the new vehicle accelerator pedal apparatus with the angle between the control assembly and the base panel greater than the minimum angle. Parts are broken away.
Figure 3:
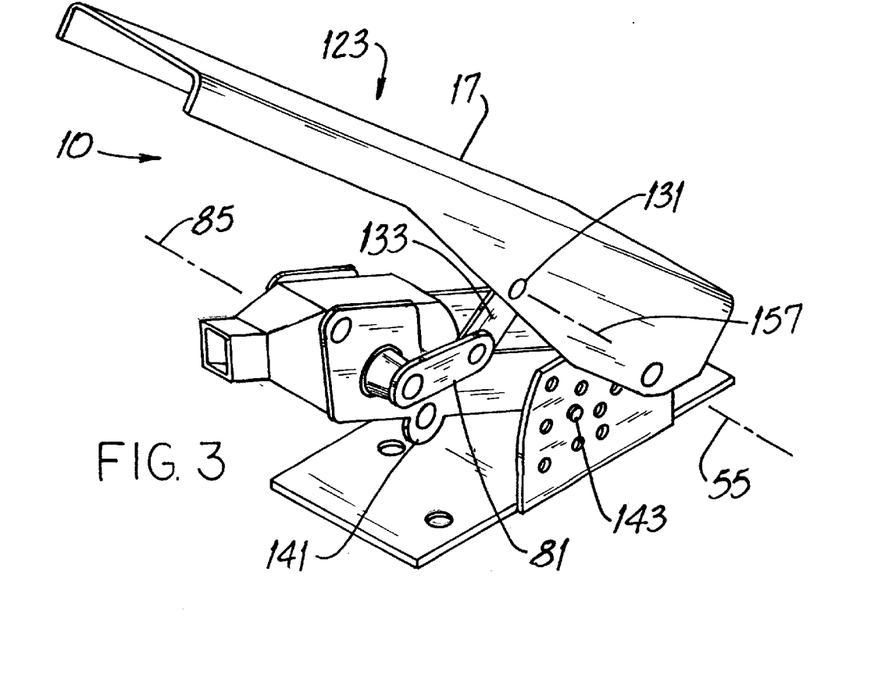
FIG. 3 is a perspective view of the accelerator pedal apparatus with the angle between the control assembly and the base panel substantially the same as shown in FIG. 2.

This specification includes an "overview" description which is followed by a more-detailed description of the structure of the new vehicle accelerator pedal apparatus 10. Referring to FIGS. 1, 2 and 3, the new apparatus 10 includes a base 11 which, when the apparatus is mounted in a vehicle, is fixed with respect to the floor 13 of such vehicle.

A control assembly 15 comprising an accelerator pedal 17 and a sensor-supporting frame 19 pivotally pinned to one another is pivot-mounted with respect to the base 11. The apparatus 10 is configured so that the included angle A between the frame 19 and the base 11 may be changed in recognition of the application and the related ergonomics. In FIG. 1, such included angle is at the minimum angle which, in a specific embodiment is 0° or near 0°. In a specific embodiment, the maximum angle is about 70°. The traces 21 shown in FIG. 1 represent the different angles.

As will become apparent (and by structure that will become apparent), the invention permits the position of the control assembly 15 to be changed with respect to the base 11. Described another way and considering the relationship of the pedal 17 and frame 19 when the pedal 17 is in its repose or engine-idle position (i.e., in the pedal position angularly fartherest from the frame 19), the included angle A1 between the pedal 17 and the frame 19 is constant for any position of the assembly 15 with respect to the base 11.

Referring also to FIGS. 4, 5, 6 and 7, the base 11 includes a substantially flat floor mounting panel 23 to be affixed to the vehicle floor 13. The base also has first and second walls 25, 27, respectively, which are parallel to one another, integrally formed with the panel 23 and extend at 90° from such panel 23. Each wall 25, 27 includes a pivot hole 29 and a bar 31 which pivotally connects the base 11, the frame 19 and the pedal 17 to one another extends through the holes 29 and through other holes described below.

Each wall includes first through eleventh apertures 33, 35, 37, 39, 41, 43, 45, 47, 49, 51, 53, respectively. When viewed along axes parallel to the pivot axis 55, the apertures 33, 35, 37, 39, 41, 43, 45, 47, 49, 51, 53, of one wall 25 are in registry with the correspondingly numbered apertures 33, 35, 37, 39, 41, 43, 45, 47, 49, 51, 53, of the other wall 27. (It is to be appreciated that the apertures 37, 39, 41, 43, 45, 47, 49, 51, 53, are identified for purposes of this specification but the apparatus 10 need not include such identifying numbers on it.)

Figure 8:
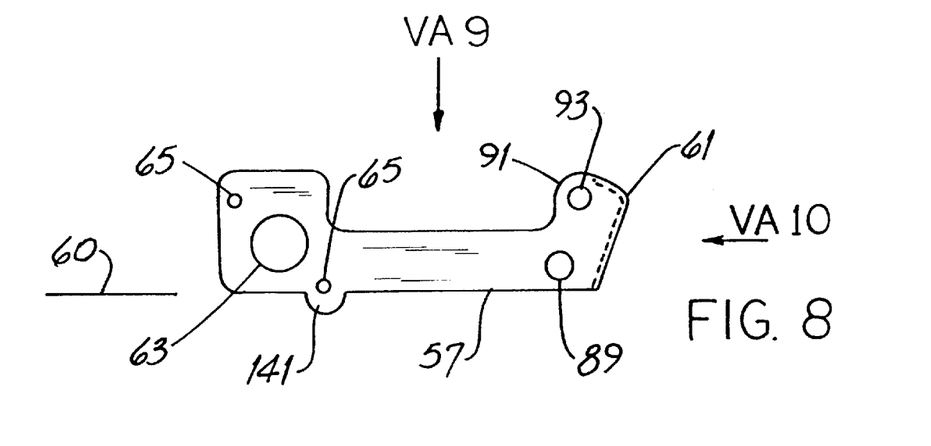
FIG. 8 is a side elevation view of the frame of the apparatus. Surfaces of parts are shown in dashed outline.
Figure 9:
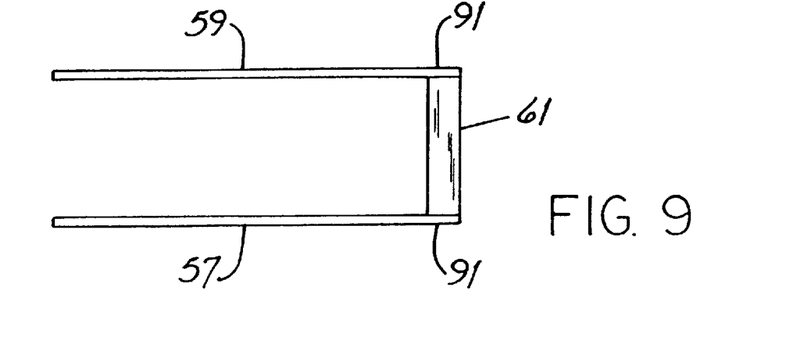
FIG. 9 is a top plan view of the frame of FIG. 8 taken along the viewing axis VA9 thereof.
Figure 10:
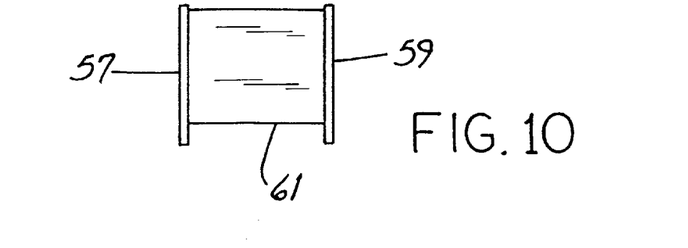
FIG. 10 is a rear elevation view of the frame of FIG. 8 taken along the viewing axis VA10 thereof.

Referring also to FIGS. 8, 9 and 10, the apparatus 10 includes a frame 19 having first and second webs 57, 59, respectively, which are parallel to one another and integrally formed (including as by spot welding) with a reverse L-shaped (as viewed in FIG. 8) reinforcing member 61 extending across the back of the frame 19. The lower edges of the webs 57, 59 define a plane 60 used as a reference regarding angle A1 in FIG. 2.

Each web 57, 59 includes a sensor mounting opening 63 and a pair of fastener openings 65. While both webs 57, 59 have an opening 63 and openings 65, only one opening 63 receives the neck 67 of a sensor mount device 69 therethrough (shown in FIG. 11) and only the openings 65, in one of the webs 57 or 59 are typically used to mount the sensor 71 and its mount device 69.

Figure 11:
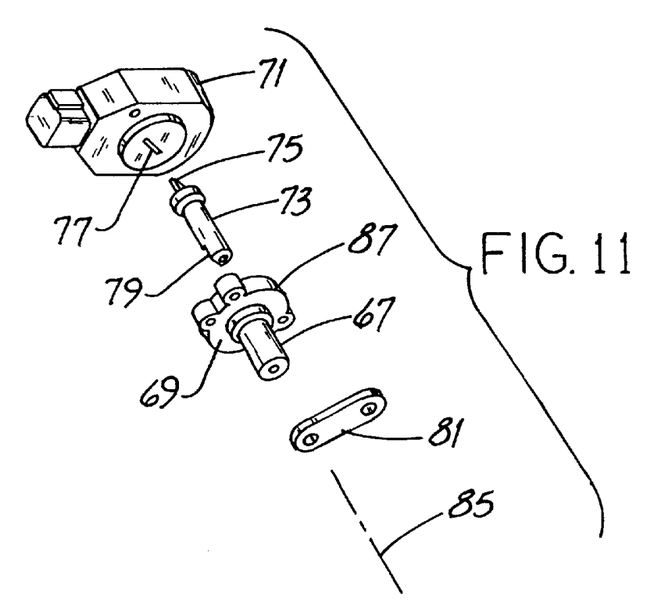
FIG. 11 is an exploded perspective view of a sensor and sensor-related components used in the apparatus.
Figure 12:
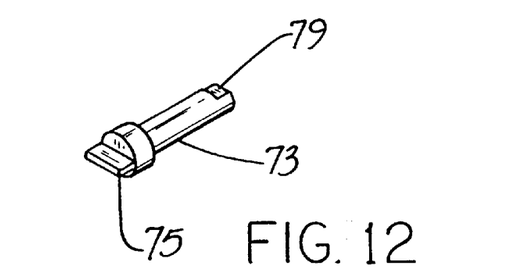
FIG. 12 is a perspective view of the sensor stem shown in FIG. 11.
Figure 13:
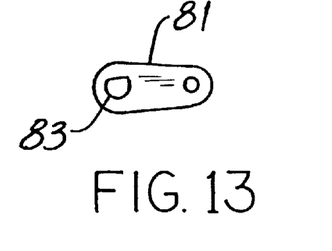
FIG. 13 is a side elevation view of the sensor drive link shown in FIG. 11.

Referring also to FIG. 12, in a known manner, the neck 67 of the mount device 69 is hollow and receives the sensor stem 73 and the tongue 75 of the stem 73 engages a notch 77 in the sensor 71. The outward end 79 of the stem 73 has a D-shaped cross-section and the stem drive link 81 (shown in FIG. 13) has a correspondingly formed D-shaped opening 83. When the link 81 rotates about the sensor axis 85, the stem 73 also rotates. For a potentiometer-type sensor 71, such stem rotation changes the resistance value of the sensor 71. The device flange 87 and the sensor 71 are affixed to one another and to the web 57 by fasteners extending through respective openings 65.

Figure 14:
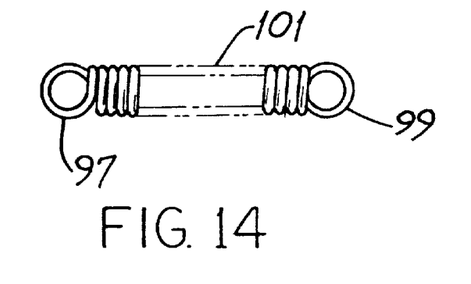
FIG. 14 is a side elevation view of a spring used in the apparatus. Surfaces are shown in dashed outline.
Figure 15:
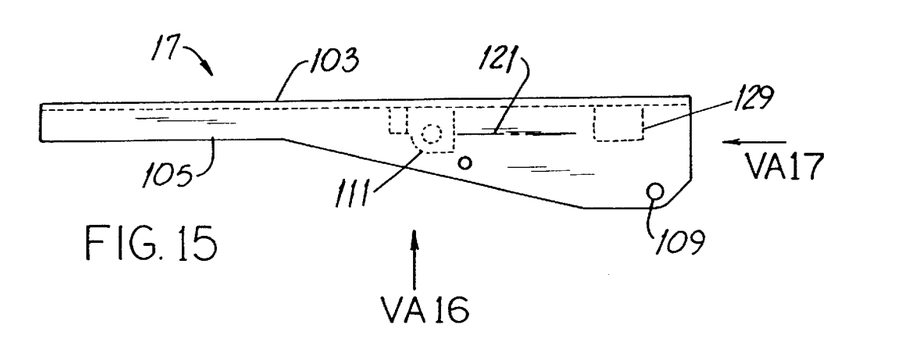
FIG. 15 is a side elevation view of the pedal used in the apparatus. Surfaces of parts are shown in dashed outline.
Figure 16:
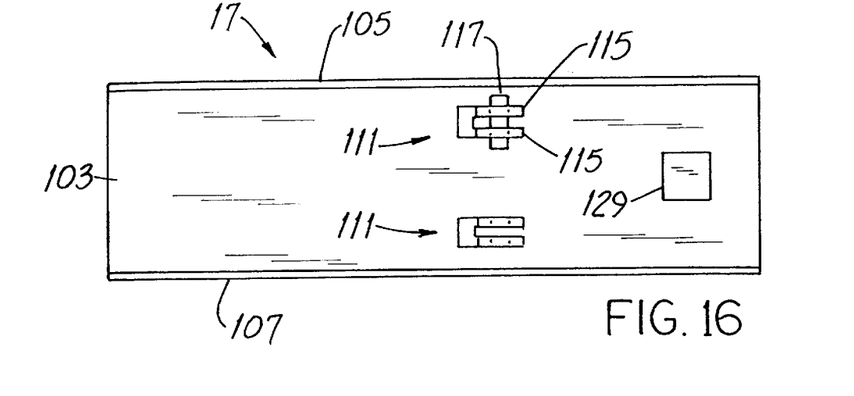
FIG. 16 is a bottom plan view of the pedal shown in FIG. 15 taken along the viewing axis VA16 thereof.
Figure 17:
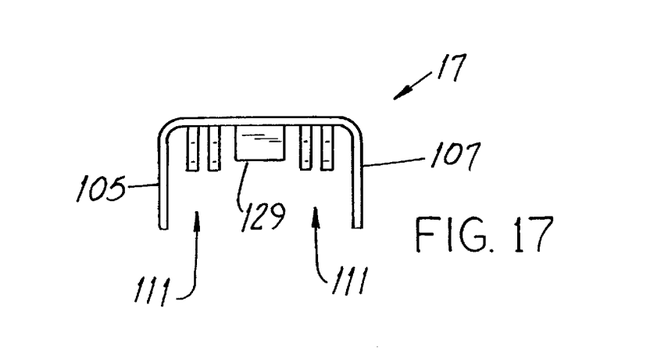
FIG. 17 is a rear elevation view of the pedal shown in FIG. 15 taken along the viewing axis VA17 thereof.
Figure 18:
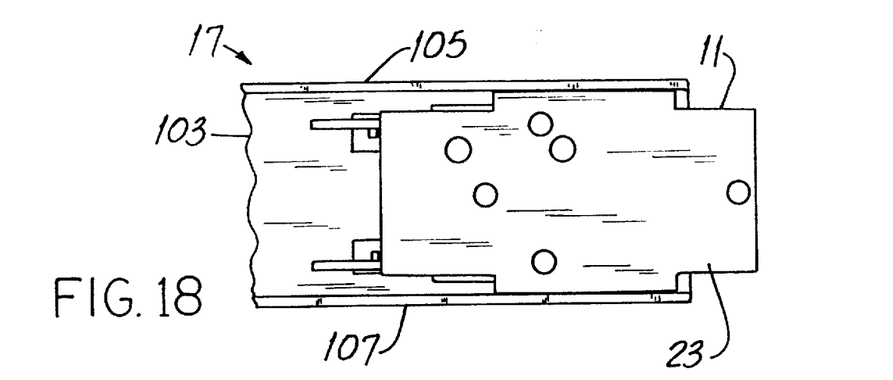
FIG. 18 is bottom plan view of the apparatus shown in FIG. 1 taken along the viewing axis VA18 thereof. Parts are broken away.

Each web 57, 59 of the frame 19 also includes a pivot hole through which the bar 31 extends. Additionally, the frame also includes a frame anchor member embodied as a pair of ears 91, each extending from a respective web 57, 59, a hole 93 in each ear and an anchor rod 95 extending through the holes 93. Considering FIG. 14 and as further noted below, end eyes 97 of springs 101 which bias the pedal 17 to a repose position are anchored to the rod 95.

Referring also to FIGS. 15, 16, 17 and 18, the pedal 17 includes a generally flat treadle piece 103 and a pair of spaced side skirts 105, 107 extending therefrom at about 90°. Each side skirt 105, 107 has a pivot bar hole 109 therethrough and the holes 109 are in registry with one another. When the apparatus 10 is assembled for use, the pedal pivot bar 31 extends through the holes 109 in the skirts 105, 107, through the holes 29 in the base walls 25, 27 and through the holes 89 in the frame webs 57, 59. Therefore, the pedal 17, the frame 19 and the base 11 are all capable of pivoting movement with respect to one another about the pedal pivot axis 55.

The pedal 17 includes at least one pedal anchor member 111 and, more preferably, includes two spaced-apart pedal anchor members 111. Each member 111 includes a pair of tabs 115 affixed to the underside of the treadle piece 103 and extending downwardly away therefrom. The tabs 115 of each member 111 are spaced sufficiently far apart to permit insertion of one end eye 99 of a spring 101 and a pin 117 extends through each pair of tabs 115 to anchor the eye 99.

Figure 19:
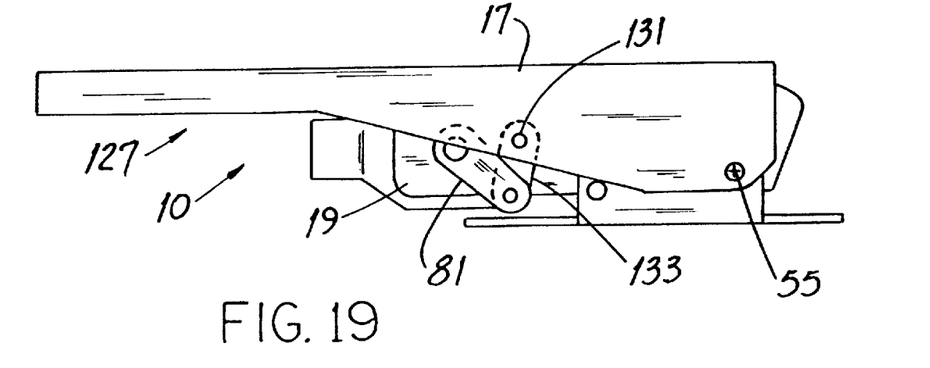
FIG. 19 is a side elevation view of the apparatus with the angle between the frame plane and the base panel at its minimum value and with the accelerator pedal depressed to its maximum-engine-speed position.

A separate tension spring 101 extends between each pedal anchor member 111 and the anchor rod 95. Each spring 101 imposes a force along an axis 121 which is generally parallel to the treadle piece 103 and which, in any event is spaced away from the pedal pivot axis 55. While a single anchor member 111 will suffice, a highly preferred embodiment includes both pedal anchor members 111 and two springs 101. This helps avoid "cocking" or skew loading and provides redundancy in the event one spring 101 breaks. Considering FIGS. 1, 2 and 3, the springs 101 bias the pedal 17 toward the repose position 123 shown in such FIGURES. (Particularly considering FIG. 2, the pedal 17 is in its repose position 123 when the angle A1 between the plane 60 and the treadle piece 103 is at the maximum exemplary 18°.) And considering FIGS. 1 and 19, such angle A1 is about zero when the pedal 17 is pushed by the operator's foot 125 to the position 127 relative to the frame 19 (as shown in FIG. 19) which provides the fastest engine speed.

The apparatus 10 also includes structure which limits pivoting movement of the pedal 17 away from the frame 19 under the urging of the springs 101. Referring to FIGS. 7 and 15–17, the pedal 17 includes a block-like abutment member 129 affixed to the underside of the treadle piece 103. The abutment member 129 contacts the anchor rod 95 when the pedal 17 is in the repose position 123 and is spaced slightly away from such rod 95 whenever the pedal 17 is in other than the repose position 123.

Referring also to FIGS. 1–3 and 19, the pedal 17 includes a link aperture 131 to which the proximal end of a pedal link 133 is pivotally pinned. The distal end of the pedal link 133 is pivotally pinned to the distal end of the stem drive link 81. It is now apparent that when the pedal 17 moves toward or away from the frame 19, the articulated linkage formed by the links 81, 133, operates to rotate the sensor stem 73 and change the value of the sensor 71.

While "full-stroke" movement of the accelerator pedal 17 is limited to 18° or so, commonly-used sensors 71 have a stem 73 which must be rotated through a significantly greater angle in order to provide a full range of engine-speed-controlling output signals. And the maximum stem rotation angle differs from sensor 71 to sensor 71. For example, the sensor stem rotation angle may vary from about 55° to about 100° or so, depending upon the particular make and model of sensor 71.

An advantage of the new apparatus 10 is that it is very easily configured to accommodate any one of the different sensors 71 now in common use. Considering FIGS. 1–3, 11, 13 and 19, it will be apparent to one of even rudimentary skill in the mechanical arts that the arc of rotation of the stem 73 can be selected by appropriate selection of links 81, 133 of proper length.

Referring again to FIGS. 1, 2, 3, 8 and 19, other aspects of the position-adjustment mechanism 135 will now be described. The frame 19 also includes a stop member 139 and when the included angle A between the frame 19 and the base panel 23 is at its minimum value as shown in FIG. 1, the stop member 139 coacts between the base 11 and the frame 19 and limits movement of the frame 19 with respect to the base 11. More particularly, the stop member 139 is embodied as a pair of feet 141, fixed with respect to the frame 19 and extending downwardly from it. Each foot 141, is coplanar with a respective frame web 57, 59 and extends away from such web 57, 59. When the included angle A is at the minimum value (about zero in a specific embodiment), each foot 141, bears against the base panel 23 and prevents further pivoting of the frame 19 toward the base 11. In a specific embodiment, the included angle A is at the minimum value when the plane 60 is parallel or nearly parallel to the base panel 23.

A highly-preferred position-adjusting mechanism 135 includes any matched pair of apertures 33, 35, 37, 39, 41, 43, 45, 47, 49, 51, 53 (i.e., any pair of apertures which are in registry with one another when viewed along an axis parallel to the pedal pivot axis 55) and further includes a pin 143 through such apertures. Considering FIGS. 2–4, in FIGS. 2 and 3, the pin 143 extends through apertures 41. Comparing FIGS. 1 with FIG. 2 or 3, when the pin 143 engages the apertures 41 and extends through them, the included angle A between the frame plane 60 and the base panel 23 is greater than the minimum value.

Figure 4:
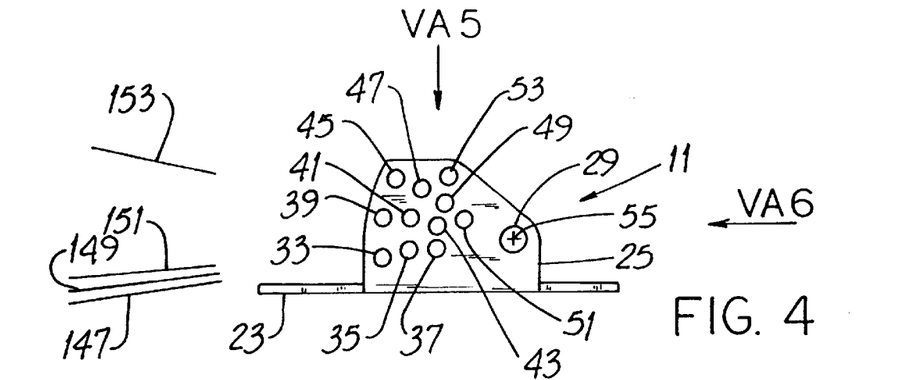
FIG. 4 is a side elevation view of the base of the apparatus.
Figure 5:
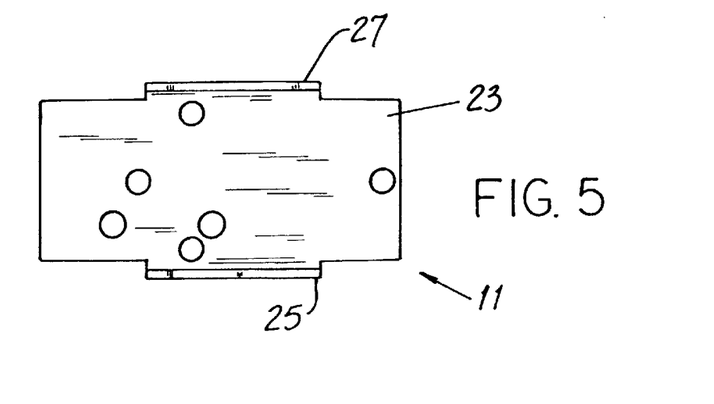
FIG. 5 is a top plan view of the base of FIG. 4 taken along the viewing axis VA5 thereof.
Figure 6:
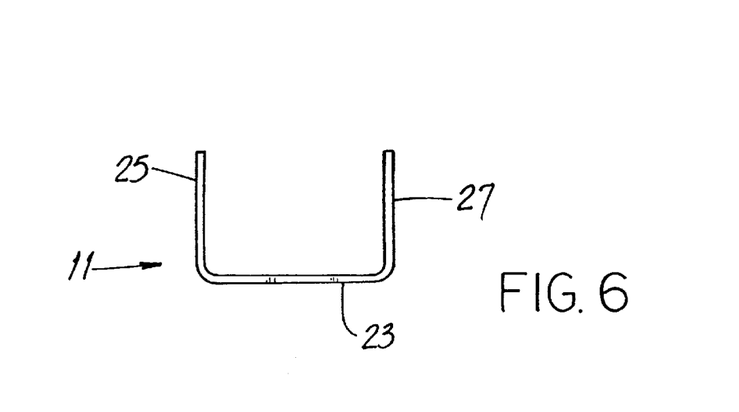
FIG. 6 is a bottom plan view of the base of FIG. 4 taken along the viewing axis VA6 thereof.
Figure 7:
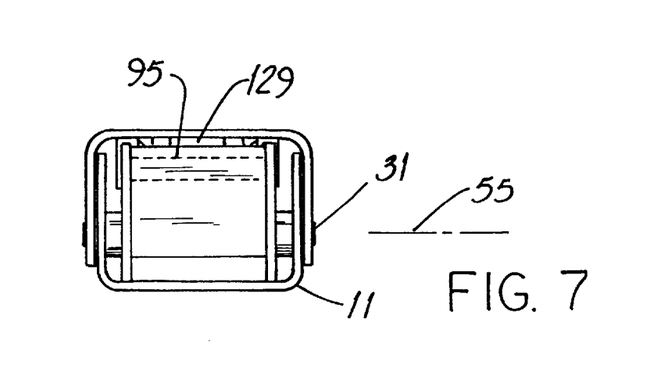
FIG. 7 is a rear elevation view of the apparatus shown in FIG. 1 and taken along the viewing axis VA7 thereof.

Considering FIGS. 1–4 and 7 and particularly FIG. 4, the pedal 17 is mounted to pivot about the pedal axis 55 and the aperture 33 is a first aperture 33 in registry with a first radial 147 normal to the pedal axis 55. The second aperture 35 is in registry with a second radial 149 normal to the pedal axis 55 and angularly spaced from the first radial 147. In a highly preferred embodiment, there are also third and fourth apertures 37, 39, respectively. Such third and fourth apertures 37, 39 are, respectively, in registry with third and fourth radials 151, 153, respectively, which are normal to the pedal axis 55 and angularly spaced from one another. The angle between any two adjacent pairs of radials, e.g., between the first and second radials or between the third and fourth radials, is between 3° and 10° and, most preferably, is about 6°. (FIG. 4 shows a variety of angles between adjacent radials.)

Referring to the FIGURES, in other aspects of the invention, the pedal 17 is mounted to pivot about the pedal axis 55, the sensor 77 has the operating stem 73 which turns about a stem axis 85 and the linkage 81, 133 is coupled between the stem 73 and a linkage axis 157 spaced from the pedal axis 55. The linkage axis 157 is fixed with respect to the pedal 17 and moves when the pedal 17 moves, irrespective of whether such pedal movement is when adjusting the frame-base included angle A or when actuating the pedal 17. The sensor axis 85 is spaced from the pedal axis 55 and the linkage axis 157 and the sensor axis 85 are spaced from one another.

The pedal 17 is mounted for movement between the repose or "engine-idle" position 123 shown in FIG. 1 and a biased position at which the vehicle engine is at a speed above idle speed. The linkage axis 157 and the sensor axis 85 are spaced by a dimension D. Considered when the pedal 17 is in the repose position 123, the dimension D is unchanged, irrespective of the value of the included angle A between the frame plane 60 and the base panel 23.

As used in this specification, the terms "vehicle" or "vehicular application" are intended to mean any land vehicle powered by an internal combustion engine and using an operator-manipulated accelerator pedal for speed control. The term "sensor" means a transducer which converts an input signal in one form to an output signal in a different form. An example of such a transducer is a rheostatic device which converts rotary mechanical motion into a changing resistance and, consequently, into a changing electrical output signal.

While the principles of the invention have been shown and described in connection with preferred embodiments, it is to be understood clearly that such embodiments are by way of example and are not limiting. For example, comparing FIGS. 1 and 2, the pedal skirt 105 may include a relief notch 159 which receives the neck 67 of the mount device 69 when the pedal 17 is fully depressed toward the frame 19. Depending upon the geometry of a particular apparatus 10, such notch 159 may or may not be needed.

As another example and comparing FIGS. 2 and 8, the sensor mounting opening 63 may be formed as in FIG. 2 and would not fully surround the neck 67. As yet another example, the position-adjusting mechanism 135 may take other forms, e.g., a single frame web 57 and a bushing-supported pin spring-biased into a base wall aperture and withdrawn therefrom against such spring.

What is claimed:

1. In a vehicle accelerator pedal apparatus having a fixed base and an accelerator pedal pivot-mounted with respect to the base, the improvement comprising:

a frame pivot-mounted with respect to the base and defining an included angle therebetween;

a sensor mounted on the frame;

an articulated linkage extending between the pedal and the sensor; and a position-adjustment mechanism coacting between the base and the frame, the mechanism adjustable to one of a plurality of user selectable settings wherein each setting corresponds to a unique minimum included angle, and wherein the mechanism prevents further pivoting of the frame beyond the minimum included angle.

2. The apparatus of claim 1 wherein:

the mechanism includes a stop member; and when the minimum included angle is at a first setting, the stop member coacts between the base and the frame and limits movement of the frame with respect to the base.

3. The apparatus of claim 2 wherein:

the stop member includes a foot fixed with respect to the frame; and when the minimum included angle is at the first setting, the foot bears against the base.

4. The apparatus of claim 1 wherein:

the included angle has a first setting;

the mechanism includes an aperture and a pin; and when the pin engages the aperture, the minimum included angle between the frame and the base is greater than the first setting.

5. The apparatus of claim 4 wherein:

the base includes a wall extending toward the frame; and the aperture is in the wall.

6. The apparatus of claim 5 wherein:

the pedal is mounted to pivot about a pedal axis;

the aperture is a first aperture and is in registry with a first radial extending from and normal to the pedal axis;

the wall includes a second aperture therethrough; and the second aperture is in registry with a second radial extending from and normal to the pedal axis, the second radial angularly spaced from the first radial.

7. The apparatus of claim 6 wherein the angle between first and second radials is between 3° and 10°.

8. The apparatus of claim 6 wherein:

the wall includes third, fourth and fifth apertures therethrough;

the third, fourth and fifth apertures are, respectively, in registry with a third, fourth and fifth radial extending from and normal to the pedal axis, each third, fourth and fifth radial angularly spaced from one another.

9. The apparatus of claim 8 wherein:

the angle between the second and third radials is between 3° and 10°;

the angle between the third and fourth radials is between 3° and 10°.

10. The apparatus of claim 1 wherein:

the pedal is mounted to pivot about a pedal axis;

the sensor has an operating shaft;

the linkage is coupled between the shaft and a linkage axis spaced from the pedal axis.

11. The apparatus of claim 10 wherein:

the linkage axis is fixed with respect to the pedal;

the sensor operating shaft turns about a sensor axis spaced from the pedal axis.

12. The apparatus of claim 11 wherein the linkage axis and the sensor axis are spaced from one another.

13. The apparatus of claim 1 wherein:

the pedal pivots about a pedal axis and is mounted for movement between a repose position and a biased position;

the sensor has an operating shaft coincident with a sensor axis;

the linkage is coupled between the shaft and a linkage axis fixed with respect to the pedal;

the linkage axis and the sensor axis are spaced by a dimension; and when the pedal is in the repose position, the dimension is unchanged, irrespective of the value of the minimum included angle.

14. The apparatus of claim 13 wherein:

the frame includes a frame anchor member;

the pedal includes a pedal anchor member; and a spring extends between the anchor members and biases the pedal toward the repose position.

15. The apparatus of claim 13 wherein:

the frame includes a pair of spaced frame anchor members having an anchor pin extending therebetween; and the pedal includes an abutment member contacting the anchor pin when the pedal is in the repose position.

* * * * *